United States Patent
Rubin et al.

(10) Patent No.: US 12,379,073 B2
(45) Date of Patent: Aug. 5, 2025

(54) HYDROGEN STORAGE SYSTEM

(71) Applicant: GRZ TECHNOLOGIES SA, Avenches (CH)

(72) Inventors: Moritz Rubin, Bern (CH); Claudio Ruch, Baar (CH); Fridolin Holdener, Wetzikon (CH); Noris Gallandat, Schwarzsee (CH)

(73) Assignee: GRZ TECHNOLOGIES SA, Avenches (CH)

(*) Notice: Subject to any disclaimer, the term of this patent is extended or adjusted under 35 U.S.C. 154(b) by 65 days.

(21) Appl. No.: 18/274,933

(22) PCT Filed: Feb. 1, 2022

(86) PCT No.: PCT/EP2022/052252
§ 371 (c)(1),
(2) Date: Jul. 28, 2023

(87) PCT Pub. No.: WO2022/167381
PCT Pub. Date: Aug. 11, 2022

(65) Prior Publication Data
US 2024/0102617 A1    Mar. 28, 2024

(30) Foreign Application Priority Data
Feb. 2, 2021 (EP) .................................... 21154748

(51) Int. Cl.
*F17C 13/04*    (2006.01)

(52) U.S. Cl.
CPC ...... *F17C 13/04* (2013.01); *F17C 2203/0643* (2013.01); *F17C 2205/0142* (2013.01);
(Continued)

(58) Field of Classification Search
CPC ............. F17C 13/04; F17C 2205/0142; F17C 2205/0138; F17C 2221/012; F17C 2205/0323; F17C 2205/0169
(Continued)

(56) References Cited

U.S. PATENT DOCUMENTS

| 2007/0144349 A1 | 6/2007 | Voss |
| 2008/0168776 A1 | 7/2008 | Arnold |

(Continued)

FOREIGN PATENT DOCUMENTS

| CN | 103185196 | * | 1/2016 |
| FR | 2953820 | | 6/2011 |

OTHER PUBLICATIONS

International Search Report and Written Opinion as issued by the International Searching Authority, dated Apr. 19, 2022, for International Patent Application No. PCT/EP2022/052252; 14 pages.

*Primary Examiner* — Rafael A Ortiz
(74) *Attorney, Agent, or Firm* — Faegre Drinker Biddle & Reath LLP (57) ABSTRACT

Hydrogen storage system (2) comprising a plurality of storage containers (6), each storage container comprising a tubular container wall (6a) and end caps (6b,6c) closing opposite ends of the tubular container wall, and a metal hydride (MH) configured for hydrogen storage contained within a chamber (13) of the storage container, the plurality of storage containers of one multi-container unit being interconnected by gas flow tubes in a direct fluidic connection ensuring that the gas pressure within the containers are substantially the same. The tubular container wall of each storage container has a diameter in a range from 1.5 cm to 10 cm adjacent ones of said plurality of storage containers of said module being separated by a gap (G) within a range (Continued)

of distance corresponding to 0.02×D to 1×D, D being diameter of the tubular container wall.

15 Claims, 5 Drawing Sheets (52) U.S. Cl.
CPC ............... *F17C 2205/0169* (2013.01); *F17C 2205/0323* (2013.01); *F17C 2221/012* (2013.01)

(58) Field of Classification Search
USPC .......................................................... 206/0.6
See application file for complete search history.

(56) References Cited

U.S. PATENT DOCUMENTS

| | | | | |
|---|---|---|---|---|
| 2010/0163802 | A1* | 7/2010 | Oshikawa | C01B 3/0084 252/372 |
| 2010/0219087 | A1* | 9/2010 | Fujita | H01M 8/04208 165/104.11 |
| 2015/0128844 | A1* | 5/2015 | Nettis | F17C 1/06 114/74 R |
| 2018/0347761 | A1* | 12/2018 | Lacombe | F17C 13/04 |

* cited by examiner

HYDROGEN STORAGE SYSTEM

CROSS-REFERENCE TO RELATED APPLICATIONS

The present application is a national stage entry of International (PCT) Patent Application Number PCT/EP2022/052252, filed Feb. 1, 2022, which claims priority to European Patent Application Number 21154748.4, filed Feb. 2, 2021, the complete disclosures of which are expressly incorporated herein by reference.

FIELD OF THE INVENTION

This invention relates to an apparatus and a method for storing hydrogen using metal hydrides.

BACKGROUND OF THE INVENTION

Hydrogen storage is a key step in the decarbonisation of fossil fuel technologies by renewable energy. A variety of storage methods including pressurized gas, hydrogen liquefaction and absorption in solid materials have been considered.

Metal hydrides are of high interest for the storage of hydrogen under low pressures as many metals and alloys are capable of reversibly absorbing significant amounts of hydrogen, whereby a high volumetric density of up 150 $kgH_2/m^3$ is reachable.

Molecular hydrogen is dissociated at the surface before absorption. Two H atoms then recombine to H2 upon desorption. The hydrogen absorption reaction in the material is typically exothermic (producing heat) whereas the hydrogen desorption reaction is conversely endothermic (absorbing heat). The low pressure and thermodynamics of metal hydride systems increase the level of safety of the system: in case of a container failure, the hydrogen will be released slowly, the process being thermally limited by the endothermic desorption reaction.

Metal hydride storage systems are thus safe, reliable and compact in comparison to compressed gas or liquefied H2 storage systems. Further, they require minimal maintenance and have a long lifetime.

Nevertheless, in view of the small gas particle size and combustibility of hydrogen gas, even at the relatively lower pressure of metal hydride storage systems, there are additional safety concerns in gas flow circuits, in particular between the hydrogen storage tanks, valves, hydrogen generation systems and hydrogen consumption systems. Each additional coupling introduces an additional source of possible leakage and thus a possible safety concern.

In order to adapt to storage requirements in many applications, hydrogen storage systems typically comprise a plurality of containers interconnected with assembled couplings, typically separated by valve mechanisms. In view of the exothermic reaction during hydrogen absorption and the endothermic reaction during the hydrogen desorption, whereby the temperature in the container affects the absorption and desorption rates, the optimal delivery and storage function requires accurately controlled processes and a certain complexity in the storage system that may reduce its reliability. Conventional hydrogen storage tanks are also often not ideal for the heat transfer requirements during absorption or desorption.

It would be advantageous to further increase the safety and reliability of hydrogen storage systems while decreasing the complexity of operating the storage system for both absorption and desorption. It is advantageous to have a system where the rate of absorption and desorption can be increased over conventional systems without increasing the complexity of operations and management of a system.

SUMMARY OF THE INVENTION

It is an object of the present invention to provide a hydrogen storage system that is compact, safe and easy to use and maintain.

It is advantageous to provide a hydrogen storage system that is cost effective to produce and to operate.

It is advantageous to provide a hydrogen storage system that may be easily implemented in a hydrogen generation and consumption system.

Objects of this invention have been achieved by providing the hydrogen storage system according to claim 1.

Disclosed herein is a hydrogen storage system comprising a plurality of storage containers (6), each storage container comprising a tubular container wall and end caps closing opposite ends of the tubular container wall, and a metal hydride configured for hydrogen storage contained within a chamber of the storage container, the plurality of storage containers of one multi-container unit being interconnected by gas flow tubes in a direct fluidic connection ensuring that the gas pressure within the containers are substantially the same. The tubular container wall of each storage container has a diameter D in a range from 1.5 cm to 10 cm. Adjacent ones of said plurality of storage containers of said module are separated by a gap G within a range of distance corresponding to 0.02×D to 1×D, preferably in a range from 0.05×D to 0.5×D.

The gas flow tubes comprise a T-shaped connection tube comprising a cap tube section extending substantially in an axial direction corresponding to an axis of the tubular container wall, and a transverse tube section extending substantially orthogonally to the axial direction and welded to a first end of the cap tube section, a second end of the end cap tube section being welded to an entry cap of the storage container.

Each storage container comprises a filter positioned on an inner side of the entry cap covering an inlet/outlet to prevent metal hydride particles from escaping the chamber through the inlet/outlet.

In an advantageous embodiment, the diameter D of the tubular container wall of each storage container is in a range from 2 cm to 8 cm, preferably in a range from 3 cm to 6 cm, for instance in a range from 4 cm to 5 cm.

In an advantageous embodiment, the gap G between the storage containers is in a range from 0.1×D to 0.4×D.

The storage containers may have a length L in a range of 50 cm to 500 cm. In an advantageous embodiment, for manufacturing, installation and maintenance practicability, the storage containers have a length in a range from 60 cm to 200 cm, preferably in range from 80 cm to 150 cm.

In an advantageous embodiment, ends of the transverse tube section are welded to ends of transverse tube sections of adjacent or opposing storage containers.

In an advantageous embodiment, one end of row storage container comprises an L-shaped or elbow-shaped connection tube extending from the entry cap to an end of a transverse tube section of the adjacent storage container.

In an embodiment, the plurality of storage containers of one multi-container unit are arranged in one row, the axes A of the containers being parallel to each other.

In another embodiment, the plurality of storage containers of one multi-container unit are arranged in two co-planar rows in an opposing arrangement such that the gas flow tubes are positioned between the two rows, the axes A of the containers being parallel to each other.

In an advantageous embodiment, the filter comprises or consists of a sintered metal disc welded at its periphery to the entry cap.

In an advantageous embodiment, the tubular container wall, entry and end caps, and gas flow tubes are made of a stainless steel.

In an advantageous embodiment, a plurality of multi-container units are arranged as a stack of multi-container units forming a storage module configured for containing hydrogen gas at a common pressure.

In an advantageous embodiment, the multi-container units of the module are interconnected fluidically together and connected to a valve for further connection to a hydrogen consumption and generation system.

In an advantageous embodiment, a plurality of said multi-container units are assembled in a stacked manner in a support structure for connection to a common hydrogen generation and consumption system or network.

In an advantageous embodiment, one or more (but not all) of said plurality of storage containers may not contain metal hydride particles and are used as a pressurized storage system for a fast desorption at cold start up until a thermal management system heats up the metal hydrides in order to enable the endothermic desorption.

In a variant, one, or more, or all storage containers may only be filled partially with metal hydrides materials to benefit from the aforementioned effect of use as a pressurized storage system at least partially for a fast desorption at cold start up until a thermal management system heats up the metal hydrides in order to enable the endothermic desorption. The amount of partial filling of said one or more storage containers may for instance be in a range from 20% to 70%.

In a particular embodiment, if all or most of the storage containers are partially filled with metal hydrides, the amount of partial filling may be between 50% and 70%, for instance around 60%.

Further objects and advantageous aspects of the invention will be apparent from the claims, and from the following detailed description and accompanying figures.

BRIEF DESCRIPTION OF THE DRAWINGS

The invention will now be described with reference to the accompanying drawings, which by way of example illustrate embodiments of the present invention and in which.

DETAILED DESCRIPTION OF EMBODIMENTS OF THE INVENTION

Referring to the figures, a hydrogen storage system 2 according to embodiments of this invention comprises a plurality of storage modules 10 mounted in a support structure 12, for instance arranged as a stack, for fluidic connection to a hydrogen source (not shown) and a hydrogen consumer (not shown). The hydrogen source may for instance be an electrolyzer using renewable energies for producing hydrogen from water, or other hydrogen bearing molecules. The hydrogen consumer may for instance be in the form of a fuel cell to produce electricity from hydrogen gas, or a hydrogen compressor with a compressed hydrogen storage tank for mobile applications or other devices for further storing or consuming hydrogen. The hydrogen consumer system may typically be used as a non-mobile buffer storage system between a system generating hydrogen and a system consuming hydrogen or further storing hydrogen for mobile applications.

An example of the use of a hydrogen storage system according to embodiments of this invention is to store hydrogen produced by a hydrogen generation system converting solar energy captured by photovoltaic panels into hydrogen gas. The hydrogen gas may then serve as a fuel that stores the captured energy, which may be reconverted into electrical power. Thus, the hydrogen storage system may act as a buffer between solar energy supply and electrical power demand. The hydrogen storage system may however be implemented in other applications, for instance for supplying hydrogen in gaseous or liquefied form for various mobile or static applications. The storage system may thus be coupled to a hydrogen compressor that feeds compressed hydrogen gas tanks for various mobile and industrial applications.

Another example of a typical application for a hydrogen storage system according to an embodiment of the invention is.

The same application as above, where electricity originates from another source (wind, hydroelectric, etc.)

The storage of the hydrogen and production of peak electrical power in times of high demands.

The storage of hydrogen produced as a waste from a chemical process and later on used for electricity generation.

Any of the above applications where hydrogen is then used for another purpose, e.g., as precursor for a chemical reaction or a fuel for the production of thermal energy The maximum pressure of the hydrogen gas output by a typical electrolyser is for instance in a range of 10 to 40 bar, depending on the type of electrolyser used.

In embodiments of the present invention, the hydrogen storage system 2 is passive, in the sense that it does not have heating means to raise the pressure of the hydrogen gas during the desorption process. The hydrogen storage system may however have a heat exchanger system between tanks to allow heat generated by exothermic processes in certain tanks to transfer to other tanks, or to be evacuated from the system by natural convection or forced convection.

In other embodiments, the inlet/outlet pressure of the hydrogen gas can be regulated with a thermal management system, whereby on heating up, the pressure increases, and on cooling down, the pressure decreases.

Each storage module 10 may comprise one or more multi-container units 4.

Each multi-container unit 4 comprises a plurality of storage containers 6 interconnected by gas flow tubes 5. The plurality of storage containers 6 of each one multi-container unit 4 are fluidically interconnected in direct fluidic connection without any valves or pressure separation means between the containers such that they are essentially at the same gas pressure and thus operate in parallel like a single container to absorb and desorb hydrogen. The multi-container unit thus functionally forms a single gas containing unit at a common internal pressure, except that the unit is separated into a plurality of interconnected containers. Each container 6 has a chamber 13 therein containing a metal hydride MH configured for storing hydrogen as per se well known in the art. Various metal hydrides, for instance as described in PCT/EP2020/059860 may be filled in the containers.

The separation of a volume of hydrogen gas in a plurality of containers as opposed to using a single container allows to have small containers with a high surface to volume ratio that can be separated by a spacing G allowing for a better heat transfer during the exothermic and endothermic reactions. Moreover, the storage volumes of each unit 4 can be easily expanded by adding more storage containers 6 without fundamentally changing the heat transfer properties and behaviour of the multi-container unit 4. The plurality of containers 6 of one multi-container unit 4 may be arranged essentially parallel to each other, aligned preferably in a planar row as illustrated.

A plurality of multi-container units 4 forming a storage module 10 may be stacked one upon the other and/or placed one next to the other and interconnected with valves V that allow the filling and emptying of the multi-container units 4 one with respect to the other similar to the management of individual storage tanks of conventional systems. The one or more valves V thus fluidically interconnect the gas flow tubes 5 of the storage containers 6 to the hydrogen generation or consumption a system (not shown).

Each storage container 6 comprises a tubular container wall 6a closed on one end by an end cap 6b and on the other end by an entry cap 6c that comprises an inlet/outlet 7.

In embodiments illustrated in FIGS. 1-5, the inlet/outlet 7 comprises an orifice substantially centrally positioned on the entry cap that is welded to a T-shaped connection tube 8 of the gas flow tubes 5. A storage container 6' at one end of the row of containers of the multi-container unit 4 comprises an elbow shaped or L-shaped connection tube 8c, however the remaining storage containers 6 are each substantially identical and comprise substantially identical T-shaped connection tubes 8.

Figure 5:
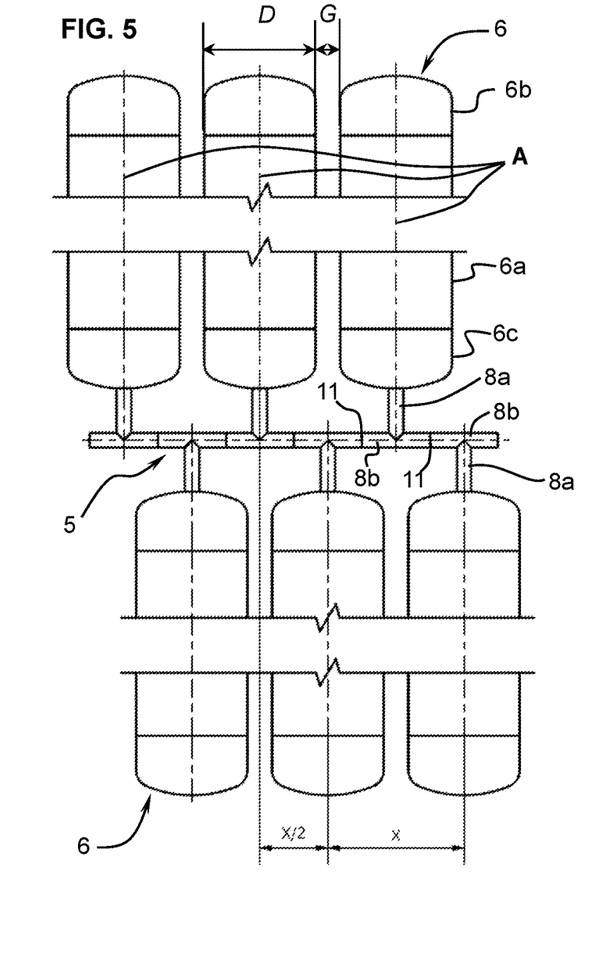
FIG. 5 is a plan view of a portion of a multi-container storage unit of a hydrogen storage system according to another embodiment of the invention.

The containers 6 may be arranged one next to the other to form a single row as illustrated in the embodiment of FIGS. 1-4, or may be arranged to form a pair of opposing rows as illustrated in the embodiment of FIG. 5.

Figure 1:
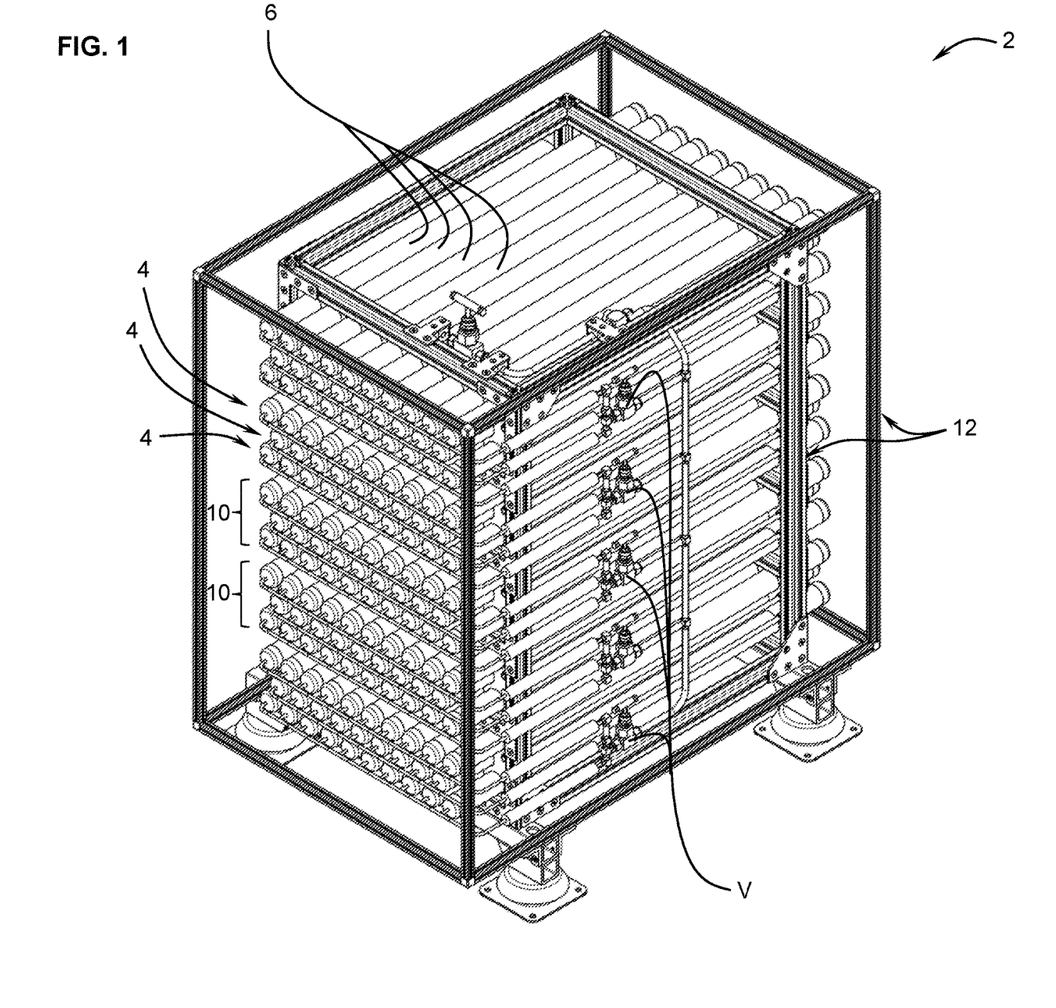
FIG. 1 is a perspective view of a hydrogen storage system according to an embodiment of the invention.
Figure 2:
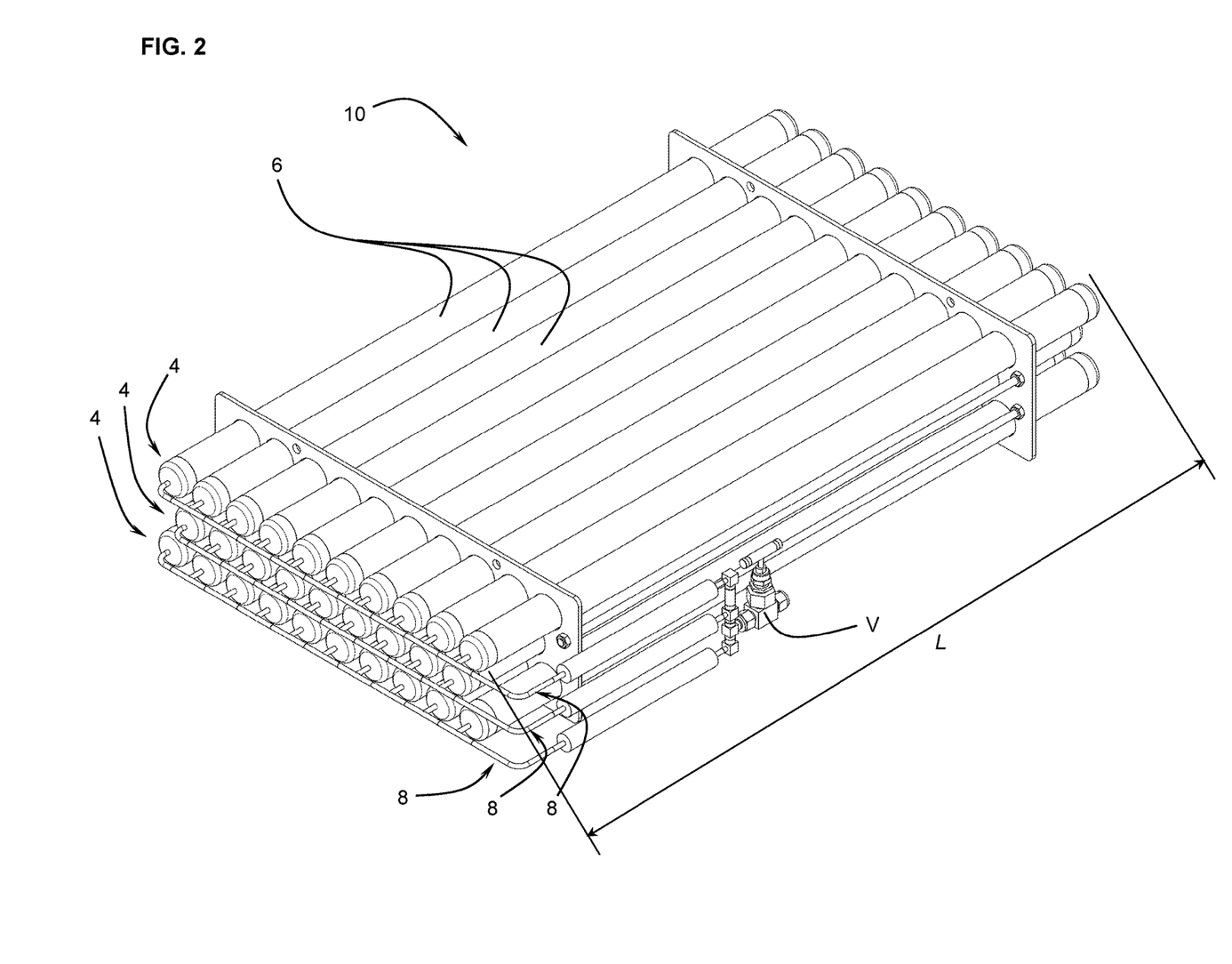
FIG. 2 is a perspective view of a multi-unit module of the hydrogen storage system of FIG. 1.
Figure 3:
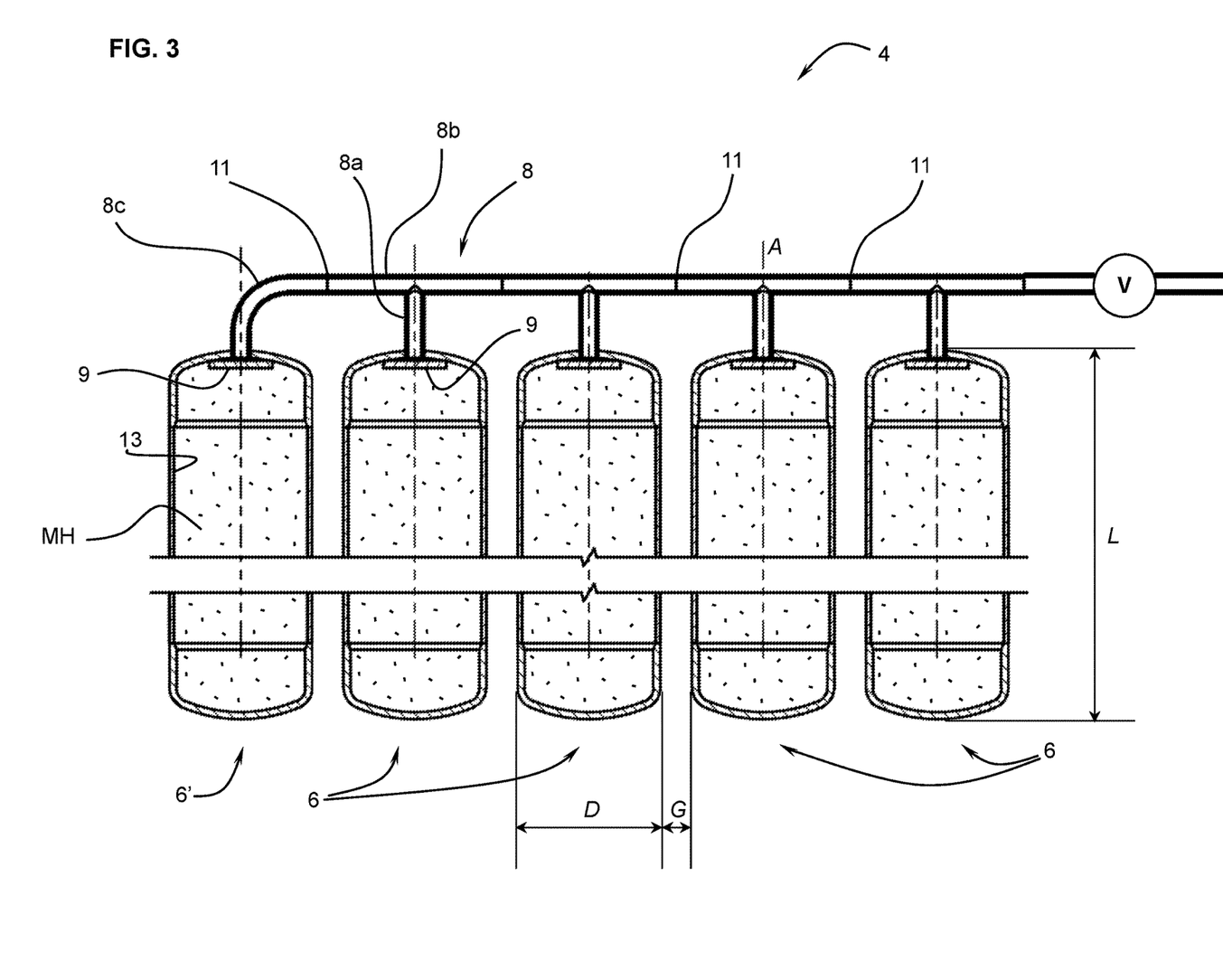
FIG. 3 is a schematic cross-sectional view of a multi-container storage unit of the module of FIG. 2.
Figure 4:
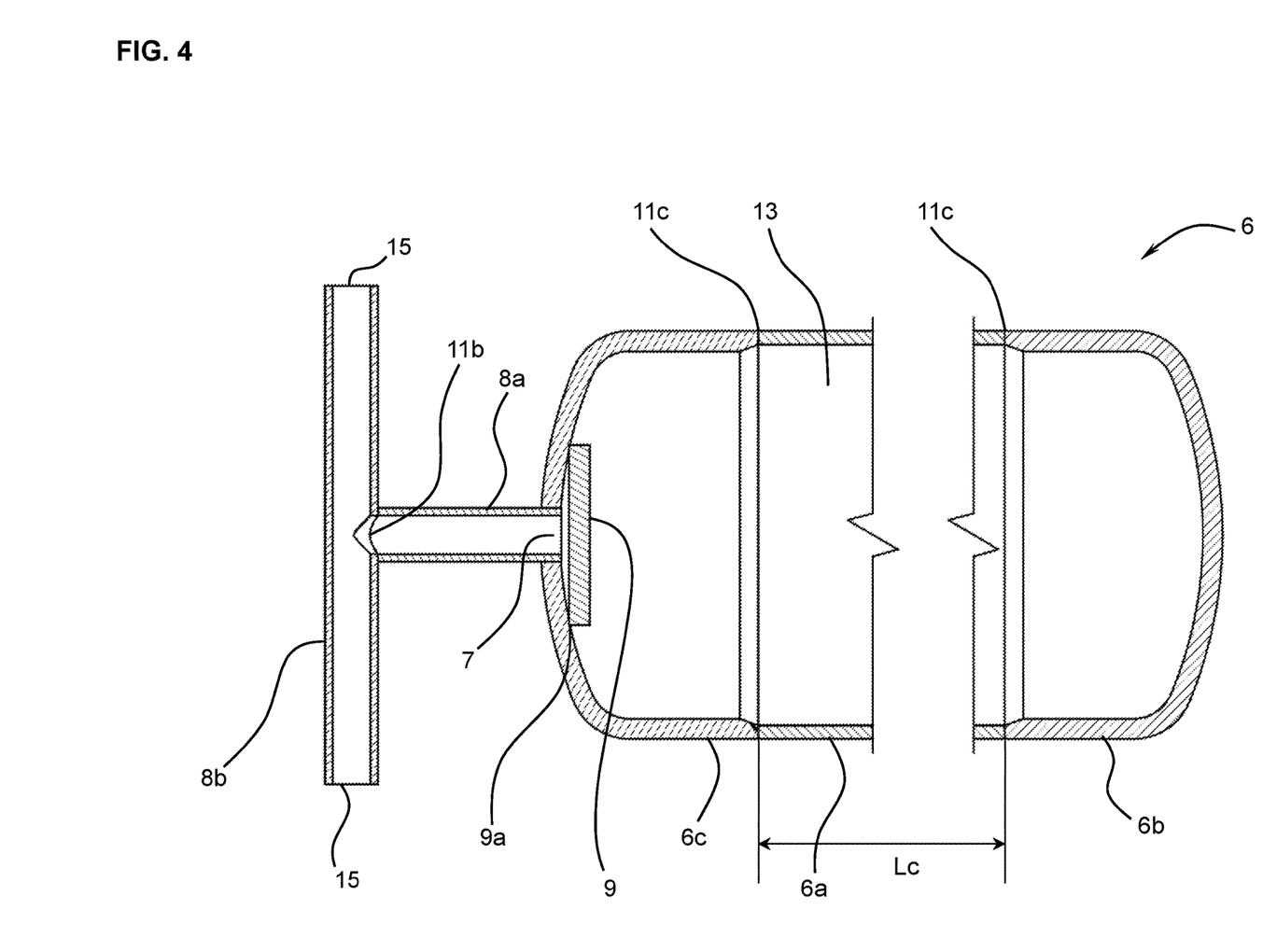
FIG. 4 is a schematic cross-sectional view of a storage container of the unit of FIG. 3.

Each T-shaped connection tube 8 comprises a cap tube section 8a that extends substantially axially from the entry cap 6c in the direction of the axis A of the tubular container wall 6a, and a transverse tube section 8b welded to an end of the cap tube section 8a. The transverse tube section 8b is orthogonal to the cap tube section and has a length either side of the axis A configured to define the desired spacing of the gap G between adjacent storage containers 6, the length depending also on whether a single row configuration as shown in FIG. 3 or a double row configuration with opposed containers as shown in FIG. 5 is provided.

The gap G between adjacent storage containers serves to allow natural or forced convection of air or another fluid through the stack of multi-container units 4 to allow a good heat transfer during the endothermic and exothermic reactions.

In certain embodiments, the hydrogen storage system may be immersed in a liquid such as water, oil, or other liquids for a better heat transfer than in air.

Figure 6:
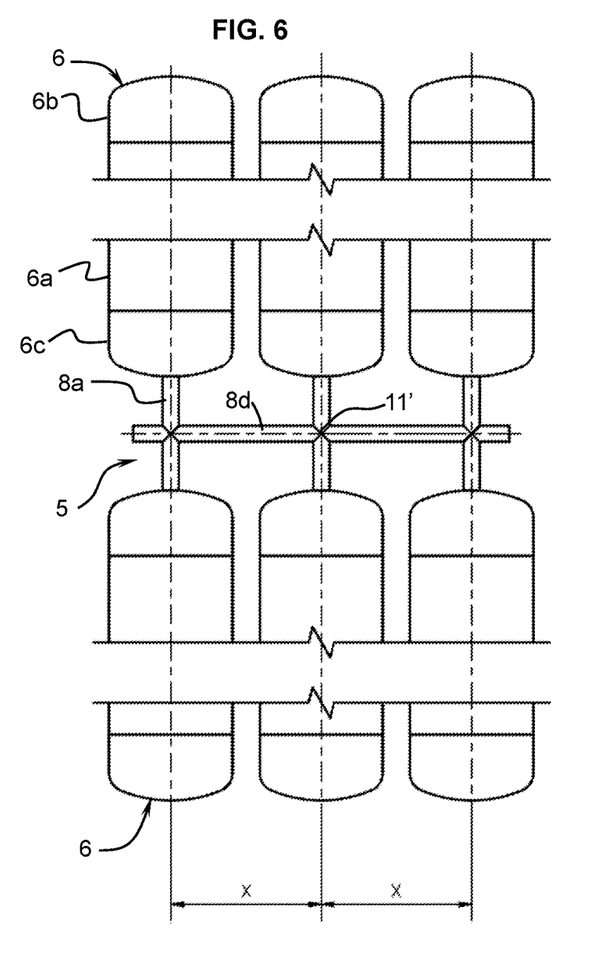
FIG. 6 is a plan view of a portion of a multi-container storage unit of a hydrogen storage system according to yet another embodiment of the invention.

Instead of a T-shaped connection tube, in another embodiment as illustrated in FIG. 6 with a double-row configuration of opposed containers 6, an end of a transverse tube section 8d is welded to an end of the cap tube section 8a to form "+" (plus) shaped welded connection tubes 8a, 8d where the weld interfaces are at the crossing point of the transb. The transverse tube section 8d is here also orthogonal to the cap tube section 8a.

The length of the storage container, in particular the tubular container wall 6a, may also be easily configured as required in order to increase or decrease the volume of each multi-container unit 4, here also without substantially modifying the heat transfer properties. The thermal behaviour of the multi-container unit may thus be substantially independent of the storage volume of the system.

An optimal heat transfer process for storage of hydrogen with metal hydrides, taking into account weight and manufacturing practicability and economy, may be obtained with storage containers 6 each having a diameter D in a range of 1.5 cm to 10 cm, preferably in a range from 2 cm to 6 cm, for instance surround 4.5 cm.

A practical length L of each storage container may be in a range of 50 cm to 600 cm but preferably is in a range from 80 cm to 200 cm, for instance in a range of 60 cm to 150 cm for manufacturing, installation and maintenance practicability.

The container wall material is preferably made of stainless steel, the end caps 6b, 6c being welded to opposite extremities of the tubular container wall 6a, for instance by mean of an orbital welding process (TIG welding). During the manufacturing process, the end cap 6b is first welded to one extremity of the tubular container wall 6a, and the metal hydride particles are then filled through the other extremity to about 70% to 90% percent of the internal volume of the container 6, and the entry cap 6c may then be welded to the other extremity of the tubular container wall 6a.

The container wall, end caps, and gas flow tubes are preferably made of stainless steel, but may also be made of other weldable metals such as aluminium. Within the scope of the invention, composite materials may also be used for the container walls, end caps and gas flow tubes.

The entry cap 6c, prior to welding to the tubular container wall 6a, is welded to the T-shaped connection tube 8. The entry cap may further comprises a filter 9 that is mounted inside the entry cap covering the inlet/outlet 7 and configured to prevent the metal hydride particles from passing into the gas flow tubes 5 while allowing hydrogen to pass therethrough.

In an advantageous embodiment, the filter 9 is made of a sintered stainless steel disc that may be welded at its outer periphery 9a to an inner side of the entry cap 6c. In view of the similar materials, welding is easily performed. Moreover the weld connection is robust and not subject to high thermal dilation forces in view of the similar coefficient of thermal expansion because similar or identical materials are used for the entry cap 6c and filter 9.

Each storage container 6 with their entry cap welded to the T-shaped connection tube thus forms an integral component during the manufacturing process, said integral components being connected together by welding the ends 15 of the transverse tube sections 8b of adjacent storage containers together to form a weld connection 11. The gas flow tubes 5 may also be made of stainless steel of same or similar compositions and grade as the stainless steel used for the entry and end caps 6c, 6b and tubular container wall 6a. Since the gas flow tubes are welded together at ends 15 of the transverse tube sections 8b, additional storage containers 6 may be easily added, depending on the desired overall storage volume, during the manufacturing process in a cost effective yet particularly reliable and safe configuration.

The entry and end caps 6b, 6c may be substantially formed by a stamp forming process, with a machining of the circular edge that forms the welding interface with the tubular container wall 6b. This also allows to ensure a particularly robust structure able to withstand a high pressure yet that is economical to manufacture and flexible with regard to the volume that may be required for the desired application.

The multi-container units 4, once the storage containers 6 have been welded together, thus have a single inlet and outlet for the plurality of the storage containers and that may be connected via one or more valves V to other multi-container units 4 in a stack with a gap therebetween similar in dimensions to the gap G between containers of a unit, in order to allow natural or forced convection around each of the containers of the system 2 for heat transfer during the endothermic or exothermic reactions.

It is possible to interconnect storage containers 6 of the multi-container unit 4 in a plurality of layers, for instance two, three or four layers, to form a single fluidically interconnected storage unit having a single common inlet and outlet to a valve. A plurality of these units may then be stacked or placed next to each other or both stacked and placed to each other to form modules of a hydrogen storage system where each of the units may be independently filled and emptied in any desired sequence, for instance as described in PCT/EP2020/059860. It is also possible in different units or modules to have different metal hydrides for low pressure and high pressure operations as described in the aforesaid patent application.

The storage containers may be filled completely, or partially with metal hydride, and different containers may comprise different level of filling of metal hydride. In particular, in an embodiment one or several storage containers may not contain metal hydride particle and be used as a conventional pressurized storage system. This enables a fast desorption at cold start up until a thermal management system heats up the metal hydrides in order to enable the endothermic desorption. In another embodiment, certain storage containers may be only filled partially with metal hydrides materials, for instance a 20-70% filling fraction, in order to achieve a similar function, namely a fast desorption at cold start up until a thermal management system heats up the metal hydrides. In yet another embodiment where all or most of the storage containers are filled partially with metal hydrides materials, the filling fraction of MH is in a range of between 50-70% of the chamber volume, for instance around 60% filling fraction.

LIST OF REFERENCES USED

Hydrogen storage system 2
  Storage module 10
    Multi-container unit 4
      Storage container 6
        Tubular container wall 6a
        End cap 6b
        Entry cap 6c
        Inlet/outlet 7
        Filter 9
        Periphery 9a
        Chamber 13
        Metal Hydride MH
      Gas flow tubes 5
        T-shaped connection tube 8
        Cap tube section 8a
        Transverse tube section 8b
        Ends 15
        Weld connection 11
  Valves V
  Support structure 12
  Control system
    Pressure sensors
    Temperature sensors
    Electrovalve control
Storage container diameter D
Gap distance between adjacent containers G
Length of a container L

The invention claimed is:

1. Hydrogen storage system comprising a plurality of storage containers, each storage container comprising a tubular container wall and end caps closing opposite ends of the tubular container wall, and a metal hydride (MH) configured for hydrogen storage contained within a chamber of the storage container, the plurality of storage containers of one multi-container unit being interconnected by gas flow tubes in a direct fluidic connection, the tubular container wall of each storage container having a diameter D in a range from 1.5 cm to 10 cm, and adjacent ones of said plurality of storage containers of said module are separated by a gap having a length in a range between $0.02 \times D$ to $1 \times D$, wherein the gas flow tubes comprise a T-shaped connection tube comprising a cap tube section extending substantially in an axial direction corresponding to an axis of the tubular container wall, and a transverse tube section extending substantially orthogonally to the axial direction and welded to a first end of the cap tube section, a second end of the cap tube section being welded to an entry cap of the storage container, each storage container comprising a filter positioned on an inner side of the entry cap covering an inlet/outlet to prevent metal hydride particles from escaping the chamber through the inlet/outlet.

2. Hydrogen storage system according to claim 1, wherein the diameter D of the tubular container wall of each storage container is in a range from 2 cm to 8 cm, preferably in a range from 3 cm to 6 cm.

3. Hydrogen storage system according to claim 1, wherein the gap (G) between the storage containers is in a range from $0.1 \times D$ to $0.5 \times D$.

4. Hydrogen storage system according to claim 1, wherein the storage containers have a length in a range from 60 cm to 200 cm, preferably in range from 80 cm to 150 cm.

5. Hydrogen storage system according to claim 1, wherein ends of the transverse tube section are welded to ends of transverse tube sections of adjacent or opposing storage containers.

6. Hydrogen storage system according to claim 5, wherein one end of row storage container comprises an "L" or elbow shaped connection tube extending from the entry cap to an end of a transverse tube section of the adjacent storage container.

7. Hydrogen storage system according to claim 1, wherein the plurality of storage containers of one multi-container unit are arranged in one row, the axes of the containers being parallel to each other.

8. Hydrogen storage system according to claim 1, wherein the plurality of storage containers of one multi-container unit are arranged in two co-planar rows in an opposing arrangement such that the gas flow tubes are positioned between the two rows, the axes of the containers being parallel to each other.

9. Hydrogen storage system according to claim 1, wherein the filter comprises or consists of a sintered metal disc welded at its periphery to the entry cap.

10. Hydrogen storage system according to claim 1, wherein the tubular container wall, entry and end caps, and gas flow tubes are made of a stainless steel.

11. Hydrogen storage system according to claim 1, wherein a plurality of multi-container units are arranged as a stack of multi-container units forming a storage module configured for containing hydrogen gas at a common pressure.

12. Hydrogen storage system according to claim 11, wherein the multi-container units of the module are interconnected fluidically together and connected to a valve (V) for further connection to a hydrogen consumption and generation system.

13. Hydrogen storage system according to claim 11, wherein a plurality of said multi-container units are assembled in a stacked manner in a support structure for connection to a common hydrogen generation and consumption system or network.

14. Hydrogen storage system according to claim 1, wherein one or more of said plurality of storage containers are only filled partially with metal hydrides materials, the non-filled fraction being used as a pressurized storage system.

15. Hydrogen storage system comprising a plurality of storage containers, each storage container comprising a tubular container wall and end caps closing opposite ends of the tubular container wall, and a metal hydride (MH) configured for hydrogen storage contained within a chamber of the storage container, the plurality of storage containers of one multi-container unit being interconnected by gas flow tubes in a direct fluidic connection, the tubular container wall of each storage container having a diameter D in a range from 1.5 cm to 10 cm, and adjacent ones of said plurality of storage containers of said module are separated by a gap having a length in a range between 0.02×D to 1×D, wherein the gas flow tubes comprise a T-shaped connection tube comprising a cap tube section extending substantially in an axial direction corresponding to an axis of the tubular container wall, and a transverse tube section extending substantially orthogonally to the axial direction and welded to a first end of the cap tube section, a second end of the cap tube section being welded to an entry cap of the storage container, each storage container comprising a filter positioned on an inner side of the entry cap covering an inlet/outlet to prevent metal hydride particles from escaping the chamber through the inlet/outlet, wherein one or more of said plurality of storage containers, but not all containers, are not filled with metal hydrides materials, the non-filled fraction being used as a pressurized storage system.

\* \* \* \* \*